United States Patent
Law

(10) Patent No.: US 9,641,616 B2
(45) Date of Patent: May 2, 2017

(54) SELF-STEERING POINT-TO-POINT STORAGE PROTOCOL

(71) Applicant: KABUSHIKI KAISHA TOSHIBA, Tokyo (JP)

(72) Inventor: Sie Pook Law, San Jose, CA (US)

(73) Assignee: Kabushiki Kaisha Toshiba, Tokyo (JP)

(*) Notice: Subject to any disclaimer, the term of this patent is extended or adjusted under 35 U.S.C. 154(b) by 95 days.

(21) Appl. No.: 14/328,446

(22) Filed: Jul. 10, 2014

(65) Prior Publication Data
US 2016/0011804 A1    Jan. 14, 2016

(51) Int. Cl.
*H04L 29/08* (2006.01)
*H04L 29/06* (2006.01)
*G06F 3/06* (2006.01)

(52) U.S. Cl.
CPC .......... *H04L 67/1097* (2013.01); *G06F 3/067* (2013.01); *G06F 3/0659* (2013.01); *H04L 67/1095* (2013.01); *H04L 69/16* (2013.01)

(58) Field of Classification Search
CPC ... H04L 67/1097; H04L 3/0659; H04L 3/067; H04L 67/1095; H04L 69/16; H04L 69/161; H04L 69/163
See application file for complete search history.

(56) References Cited

U.S. PATENT DOCUMENTS

| | | | |
|---|---|---|---|
| 7,149,819 B2 | 12/2006 | Pettey | |
| 7,430,589 B2 | 9/2008 | Veprinsky et al. | |
| 8,116,309 B2 | 2/2012 | Sharma | |
| 2007/0299952 A1 | 12/2007 | Goodman et al. | |
| 2009/0028093 A1* | 1/2009 | Shon | H04L 1/188 370/328 |
| 2009/0063786 A1* | 3/2009 | Oh | G06F 11/1068 711/148 |
| 2009/0138597 A1* | 5/2009 | Isaac | G06F 13/1684 709/225 |
| 2010/0195665 A1* | 8/2010 | Jackson | H04L 1/1607 370/464 |
| 2012/0106552 A1* | 5/2012 | Iwao | H04L 45/36 370/392 |

* cited by examiner

*Primary Examiner* — Arpan P. Savla
*Assistant Examiner* — William E Baughman
(74) *Attorney, Agent, or Firm* — Patterson & Sheridan, LLP

(57) ABSTRACT

Techniques are disclosed for processing a self-steering storage command via a point-to-point communication protocol. A network adapter in a storage node receives an instance of a current command frame directed to a group of storage nodes and performs a storage operation in response to a storage command associated with the current command frame. The network adapter determines whether all storage nodes have received an instance of the current command frame. If all storage nodes have received an instance of the current command frame, then the network adapter transmits a final completion status frame to a computation node that originated the current command frame. Otherwise, the network adapter generates a next instance of the command frame, and transmits the next instance of the current command frame to an additional storage node in the group of storage nodes.

20 Claims, 7 Drawing Sheets

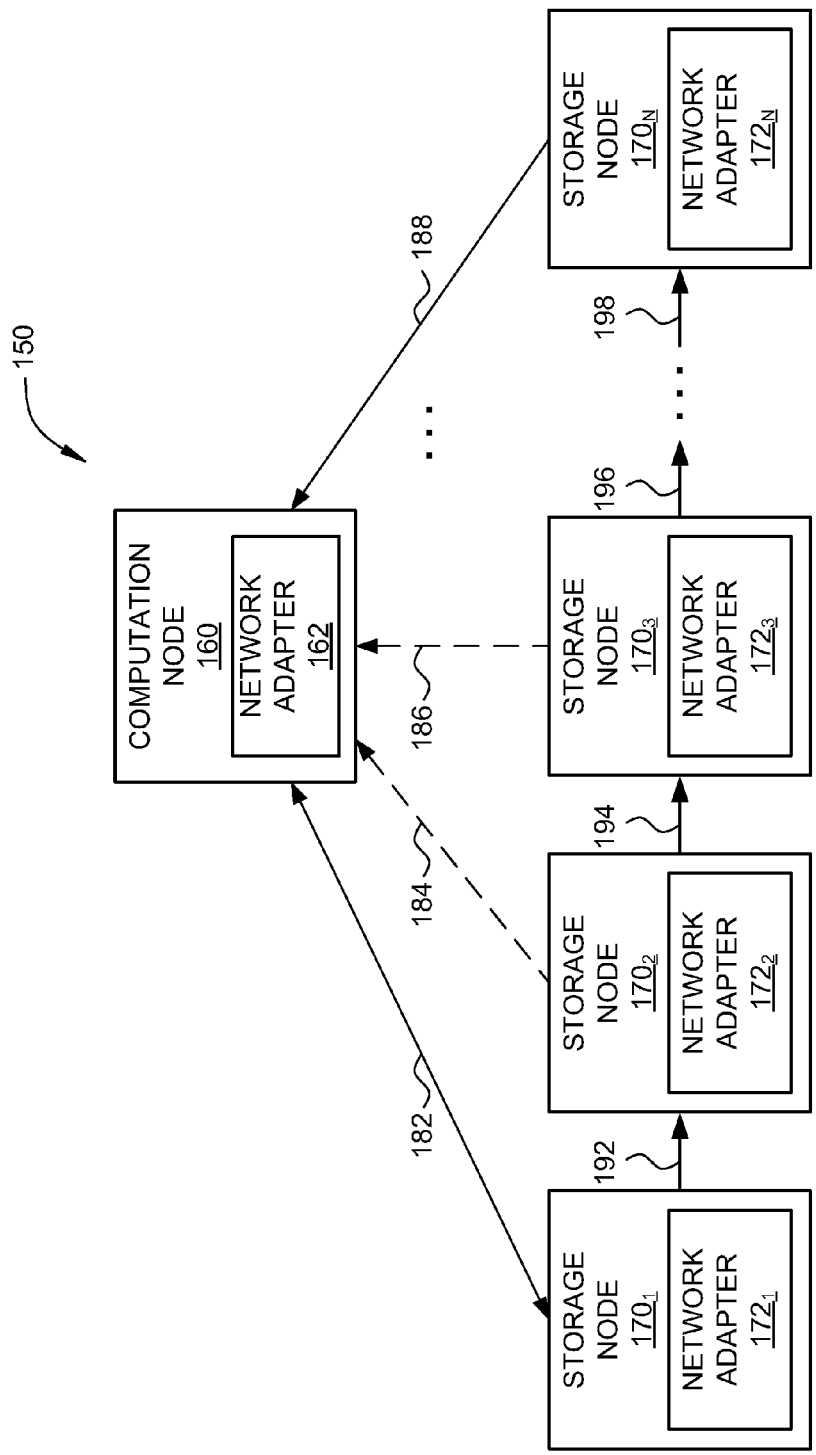

SELF-STEERING POINT-TO-POINT STORAGE PROTOCOL

BACKGROUND

Distributed storage systems include one or more computation nodes that read and write data to storage nodes. Typically, data is replicated, or mirrored, across two or more storage nodes to improve data transfer performance and provide redundancy. For example, a data file could be stored in three storage nodes located in three geographically diverse locations. A computation node accessing the data file would first attempt to locate the file in the storage node that is geographically closer to the computation node. Generally, access time is improved if the computation node and the storage node are nearer to each other geographically. If, however, the data file on this storage node is missing or corrupt, the computation node would next attempt to locate the data file one of the other two storage nodes that contain a copy of the data file.

A computation node that stores a new data file or modifies an existing data file sends point-to-point command frames, along with the new or modified data, to each storage node that is designated to store a copy of the data file. Each storage node that receives such a command frame stores or modifies the data file, as directed by the command frame. For example, if a data file is designated to be stored on three separate storage nodes, the computation node would send a separate command frame to each of the three storage nodes. Each storage node would receive the respective command frame, and then store or modify the data as directed by the command frame.

One drawback with this approach is that as the quantity of replicas of a data file increases, the performance burden on the computation node increases as a function of the quantity of storage nodes that contain a replica of the file. A possible solution to address this drawback is to add one or more computational nodes. The computational nodes then divide the task of generating command frames to create or modify replicas of the data file and sending the command frames to the storage nodes. However, adding computational nodes for the purpose of replicating data files is costly in terms of price, power requirements, and physical space.

SUMMARY

One embodiment of the present application sets forth a method for processing a self-steering storage command via a point-to-point communication protocol, the method implemented in a current storage node that is one of a plurality of storage nodes. The method includes the steps of receiving, at the current storage node in a plurality of storage nodes, a current instance of a current command frame directed to the plurality of storage nodes, performing a storage operation in response to a storage command associated with the current command frame, and determining whether all storage nodes in the plurality of storage nodes have received an instance of the current command frame. If all storage nodes in the plurality of storage nodes have received an instance of the current command frame, a final completion status frame is transmitted to a computation node that originated the current command frame. If all storage nodes in the plurality of storage nodes have not received an instance of the current command frame, a next instance of the current command frame is generated, and the next instance of the current command frame is transmitted to an additional storage node in the plurality of storage nodes.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a computing system configured to implement one or more aspects of the disclosed methods.

BRIEF DESCRIPTION OF THE DRAWINGS

FIG. 1B depicts a distributed storage system that may implement one or more embodiments of the present disclosure.

DETAILED DESCRIPTION

In an embodiment of the present disclosure, a standard point-to-point protocol, such as Ethernet (TCP/IP) protocol, is extended to provide fields that enable certain messages to be self-steering. That is, message packets for certain storage related activities may be directly routed, or self-steered, from one storage module to another without intervention from a computation node. Via the disclosed self-steering messages, storage modules are enabled to communicate with each other intelligently. As a result, storage related activities are efficiently performed with reduced computational load on the computation node, increasing the ability of the computation node to perform other computational tasks.

Figure 1A:
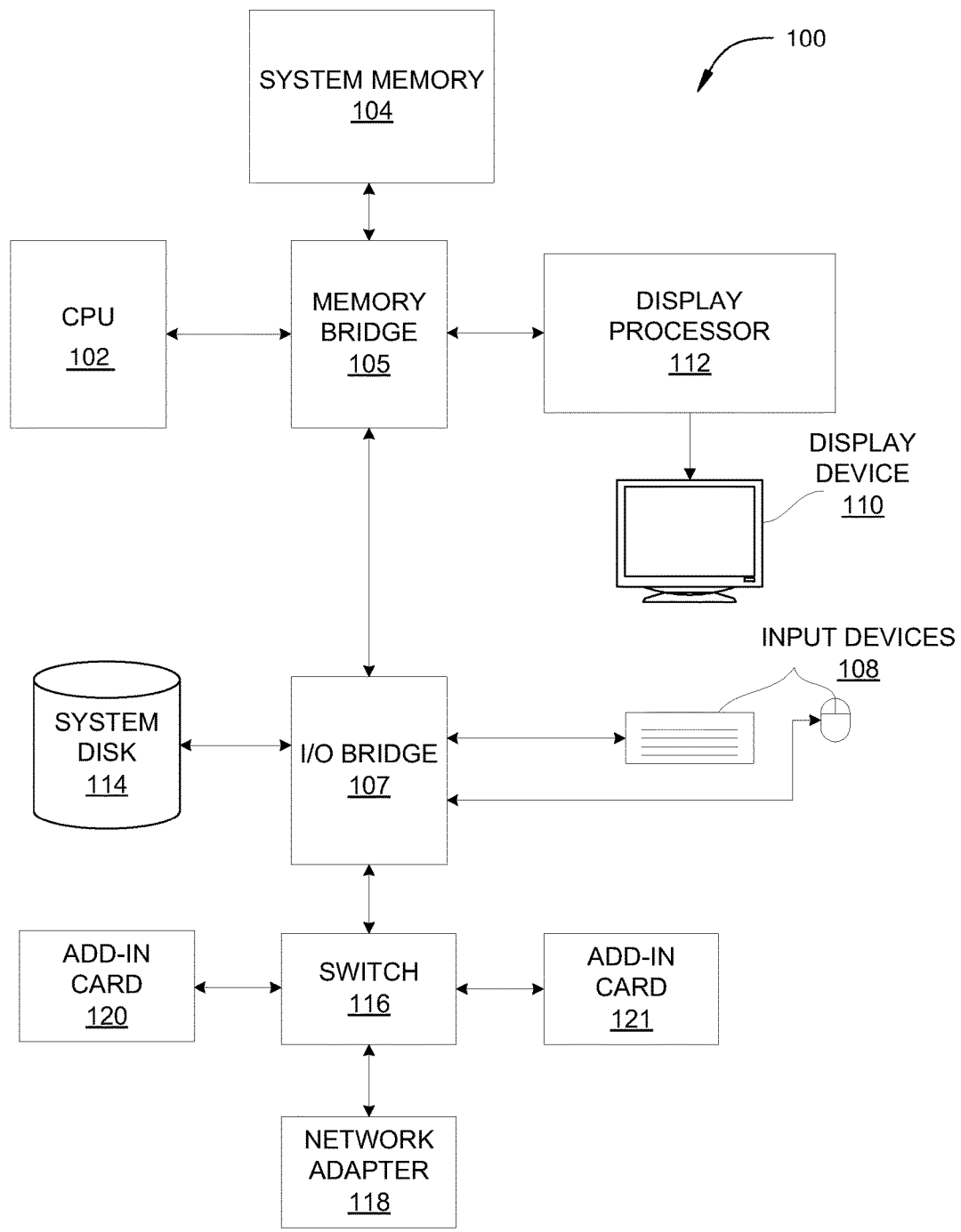
FIG. 1A depicts one architecture of a system within which embodiments of the present disclosure may be implemented.

FIG. 1A depicts one architecture of a system 100 within which embodiments of the present invention may be implemented. This figure in no way limits or is intended to limit the scope of the present invention.

System 100 is typically a server, but may be a personal computer, server, video game console, personal digital assistant, mobile phone, mobile device or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. In one embodiment, network adapter 118 is an Ethernet adapter. In other embodiments, network adapter 118 may be any adapter configured to allow system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1A may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

FIG. 1B depicts a distributed storage system 150, according to one embodiment. As shown, the distributed storage system 150 includes a computation node 160 and storage nodes $170_1$-$170_N$. Computation node 160 may be implemented via any technically feasible system architecture, such as system 100 of FIG. 1A.

Computation mode 160 is configured to execute one or more software programs (not shown), including, without limitation, an operating system, device drivers, and user application programs. One or more of these software programs may be configured to access data stored on one or more of storage nodes $170_1$-$170_N$. Computation node 160 accesses storage nodes $170_1$-$170_N$ via a point-to-point communication protocol, such as Ethernet. Computation node 160 includes a network adapter 162. Network adapter 162 functions primarily the same as network adapter 118 of FIG. 1A, except as further described herein. To communicate with storage nodes $170_1$-$170_N$, computation node 160 transmits a command to network adapter 162. The command directs network adapter 162 to transmit commands to write, read, modify, or delete data stored on one or more storage nodes $170_1$-$170_N$. Network adapter 162 creates a corresponding command frame directed to storage node $170_1$, according to the point-to-point communication protocol. Network adapter 162 then transmits command frame to a network adapter $172_1$ located in storage node $170_1$, via communication path 182.

Storage nodes $170_1$-$170_N$ are configured to store data accessed by software programs executing on computation node 160. Storage nodes $170_1$-$170_N$ may be implemented via any technically feasible approach, including, without limitation, a storage array, network-attached storage (NAS), just-a-bunch-of-disks (JBOD), hard disk drive (HDD), or solid-state drive (SSD). Each storage node $170_1$-$170_N$ includes a corresponding network adapter $172_1$-$172_N$. Network adapters $172_1$-$172_N$ function primarily the same as network adapter 118 of FIG. 1A, except as further described herein. For clarity, four plus storage nodes $170_1$, $170_2$, $170_3$, $170_N$ are illustrated in FIG. 1B. However, the distributed storage system 150 may include any quantity N of storage nodes $170_1$-$170_N$, where N is two or more.

Network adapter $172_1$ in storage node $170_1$ receives a command frame via communication path 182 to write, read, modify, or delete data stored in a data file located in storage node $170_1$. Network adapter $172_1$ performs one or more functions associated with the point-to-point protocol, including, without limitation, parsing the command frame, and calculating a frame check sequence value to determine whether the command frame was correctly transmitted. Network adapter $172_1$ then transfers the command to storage node $170_1$ for further processing. Storage node $170_1$ performs a data write, read, modify, or delete, as specified by the command, and signals network adapter $172_1$ when command processing is complete. Network adapter $172_1$ creates a copy of the received command frame and modifies certain fields of the command frame, such as the source and destination address. Network adapter $172_1$ transmits the modified copy of the command frame to network adapter $172_2$ in storage node $170_2$ via communication path 192.

Likewise, network adapter $172_2$ receives the command frame via communication path 192, processes the command frame, and transfers the command to storage node $170_2$ for further processing. Network adapter $172_2$ transmits a modified copy of the command frame to network adapter $172_3$ in storage node $170_3$ via communication path 194.

Network adapter $172_3$ receives the command frame via communication path 194, processes the command frame, and transfers the command to storage node $170_3$ for further processing. Network adapter $172_3$ transmits a modified copy of the command frame to the network adapter in the next storage node (not shown) via communication path 196. Network adapter $172_N$ receives the command frame via communication path 198 from the network adapter in the penultimate storage node (not shown), processes the command frame, and transfers the command to storage node $170_N$ for further processing. Network adapter $172_N$ transmits a status frame to network adapter 162 in computation node 160 via communication path 188, indicating that processing of the command frame is complete. In some embodiments, the original command frame may direct each of storage nodes $170_1$-$170_N$ to transmit a status frame to computation node 160 after processing the command frame. In such embodiments, storage node $170_1$ may transmit a status frame via communication path 182, storage node $170_2$ may transmit a status frame via communication path 184, storage node $170_3$ may transmit a status frame via communication path 186, and so on.

Each command frame and status frame includes various fields, as further described below.

Figure 2:
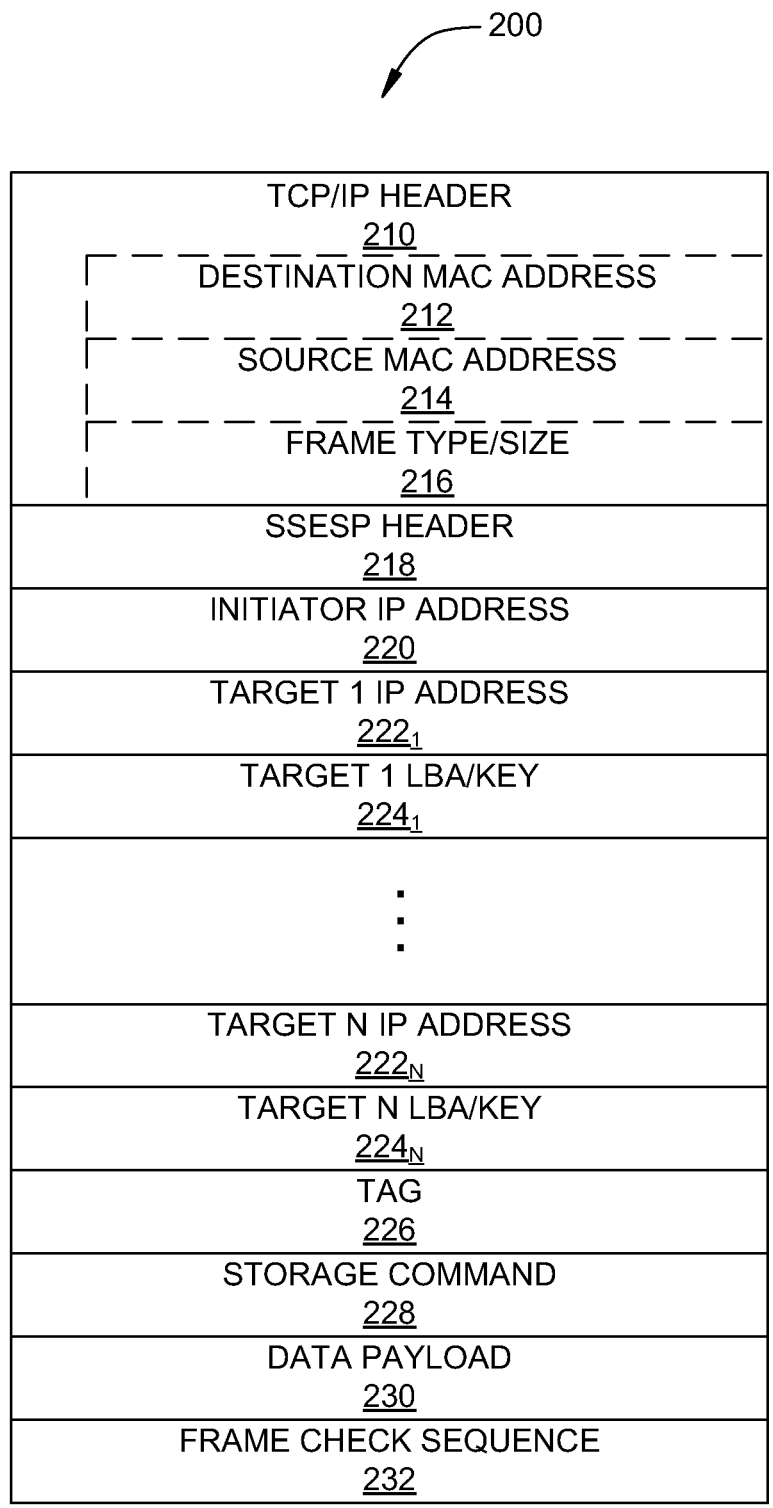
FIG. 2 illustrates a self-steering point-to-point command frame, according to one embodiment.

FIG. 2 illustrates a self-steering Ethernet storage protocol (SSESP) command frame 200, according to one embodiment. As shown, command frame 200 includes a transmission control protocol/internet protocol (TCP/IP) header 210, which, in turn, includes a destination media access control (MAC) address 212, a source MAC address 214, and a frame type/size field 216. As also shown, command frame 200 includes an SSESP header 218, an initiator IP address 220, target IP addresses $222_1$-$222_N$, target LBA/keys $224_1$-$224_N$, a tag 226, a storage command 228, a data payload 230, and a frame check sequence 232.

Destination media access control (MAC) address 212 is the MAC address of the node to which command frame 200 is directed. Likewise, source MAC address 214 is the MAC address of the node that created command frame 200. For example, a command frame created by computation node 160 and directed to storage node $170_1$ would have a source MAC address corresponding to computation node 160 and a destination MAC address corresponding to storage node $170_1$. A command frame created by storage node $170_1$ and directed to storage node $170_2$ would have a source MAC address corresponding to storage node $170_1$ and a destination MAC address corresponding to storage node $170_2$.

Frame type/size 216 either identifies the size of data payload 230 or indicates a type associated with command frame 200. If the value of frame type/size 216 is within a first range, then frame type/size 216 corresponds to the size of data payload 230. If the value of frame type/size 216 is within a second range, then frame type/size 216 corresponds to a frame type that differentiates among variations in the Ethernet protocol that affect, for example, how the data payload is structured.

SSESP header 218 contains various fields associated with command frame 200. These fields (not explicitly shown) include, without limitation, an Internet protocol (IP) format type, the quantity of target fields in command frame 200, and a status option that specifies how status is reported back to originating computation node 160. The field specifying IP format type indicates the version of IP associated with command frame 200, e.g. IPv4 or IPv6. The field specifying the quantity of target fields in command frame 200 is a value that indicates the quantity of target IP addresses $222_1$-$222_N$ plus the quantity of target LBA/keys $224_1$-$224_N$ included in command frame 200. Generally, the quantity of target fields in command frame 200 is equal to the quantity of target storage nodes times two. For example, if command frame 200 is directed to N target storage nodes $170_1$-$170_N$, then the quantity of target fields would be 2*N.

Originating computation node 160 sets the status option to a first value to direct all target storage nodes $170_1$-$170_N$ to transmit a status frame, further described below, to originating computation node 160 after processing command frame 200. Originating computation node 160 sets the status option to a second value to direct only the last target storage node $170_N$ to transmit a status frame to originating computation node 160 after processing command frame 200.

Initiator IP address 220 is the IP address of computation node 160 that originated command frame 200. Storage nodes $170_1$-$170_N$ use initiator IP address 220 to determine the destination IP address for transmitting status frames, as directed by command frame 200.

For each storage node $170_1$-$170_N$, command frame 200 includes corresponding target IP addresses $222_1$-$222_N$ and target LBA/keys $224_1$-$224_N$, as described below.

Target IP addresses $222_1$-$222_N$ are the IP addresses of each storage node $170_1$-$170_N$ targeted by command frame 200, respectively.

Target LBA/keys $224_1$-$224_N$ represent a logical block address (LBA) or a key for each storage node $170_1$-$170_N$, respectively. If the data in data payload 230 are associated with a block storage approach, then target LBA/keys $224_1$-$224_N$ specify the LBA for each storage node $170_1$-$170_N$, respectively. If, however, the data in data payload 230 are associated with a key-value store (KVS) approach, then target LBA/keys $224_1$-$224_N$ specify the key for each storage node $170_1$-$170_N$, respectively. Typically, there is one LBA or one key for each storage node $170_1$-$170_N$. Alternatively, in some embodiments, more than one LBA or more than one key may exist for one or more storage nodes $170_1$-$170_N$.

Tag 226 enables traffic tracking and queuing for command frames, such as command frame 200. Typically, point-to-point protocols, such as Ethernet, provide no mechanism for queuing commands. Therefore, a storage node generally cannot receive a new command frame until the storage node completes processing of the current command frame. Because of this limitation, computation node 160 may use tag 226 in conjunction with the status option in SSESP header 218 to track command frame 200 as command frame 200 progresses through storage nodes $170_1$-$170_N$.

In one example, computation node 160 could issue a first command frame 200 with tag 226 set to 0 and with the status option specifying that all storage nodes $170_1$-$170_N$ are directed to transmit status frames. After processing the first command frame 200, storage node $170_1$ would transmit a status frame back to computation node 160 with tag set to 0 and would also transmit a modified copy of the first command frame 200 with tag 226 set to 0 to storage node $170_1$.

In response to receiving a status frame with tag set to 0 from storage node $170_1$, computation node 160 could issue a second command frame 200 with tag 226 set to 1 and with the status option specifying that all storage nodes $170_1$-$170_N$ are directed to transmit status frames. After processing the second command frame 200, storage node $170_1$ would transmit a status frame back to computation node 160 with tag set to 1 and would also transmit a modified copy of the second command frame 200 with tag 226 set to 1 to storage node $170_1$. Likewise, after processing the first command frame 200, storage node $170_2$ would transmit a status frame back to computation node 160 with tag set to 0 and would also transmit a modified copy of the first command frame 200 with tag 226 set to 0 to storage node $170_3$.

In response to receiving a status frame with tag set to 1 from storage node $170_1$ and a status frame with tag set to 0 from storage node $170_2$, computation node 160 could issue a third command frame 200 with tag 226 set to 2 and with the status option specifying that all storage nodes $170_1$-$170_N$ are directed to transmit status frames. The process would continue in this manner until each storage node is concurrently processing a command frame 200 with a different value for tag 226. Computation node 160 would then issue a new command frame 200 when all storage nodes $170_1$-$170_N$ complete processing of the respective command frames 200 and report completion status to computation node 160 via corresponding status frames.

Storage command 228 identifies a particular self-steering command performed by storage nodes $170_1$-$170_N$ in response to command frame 200. Storage command 228 may indicate any one of a number of commands, including, without limitation, (1) copy on write; (2) read and compare; (3) read, compare, and replace; (4) read, compare, and delete; (5) read and copy; and (6) mass delete.

If storage command 228 specifies a copy on write command, then each storage node $170_1$-$170_N$ copies data payload 230 into the location specified by respective target LBA/keys $224_1$-$224_N$. If the status option in SSESP header 218 directs only the final target source node $170_N$ to transmit a status frame, then storage node $170_N$ transmits a successful completion status frame to computation node 160 if the copy on write command is successfully performed by each storage node $170_1$-$170_N$. However, if the status option in SSESP header 218 directs all target source nodes $170_1$-$170_N$ to transmit a status frame, then a completion status is returned by each storage node $170_1$-$170_N$.

If storage command 228 specifies a read and compare command, then the first storage node $170_1$ retrieves data from the location specified by target LBA/keys $224_1$ and returns the retrieved data to computation node 160. Storage node $170_1$ then transmits command frame 200 to the second storage node $170_2$ where payload data 230 includes a copy of the retrieved data. Each of storage nodes $170_2$-$170_N$ compares the payload data 230 with the data at the location specified by respective target LBA/keys $224_2$-$224_N$. If the status option in SSESP header 218 directs only the final target source node $170_N$ to transmit a status frame, then storage node $170_N$ transmits a successful completion status frame to computation node 160 if the read and compare command is successfully performed by each storage node $170_2$-$170_N$ and all copies of the data stored on storage nodes $170_2$-$170_N$ match the data transmitted by storage node $170_1$. If a particular storage node determines that the local copy of the data does not match payload data 230, then that storage node transmits a failure status frame to computation node 160. However, if the status option in SSESP header 218 directs all target source nodes $170_1$-$170_N$ to transmit a status frame, then a comparison status is returned by each storage node $170_1$-$170_N$ whether the copy on write command resulted in successful comparison or in a mis-compare.

If storage command 228 specifies a read, compare, and replace command, then each storage node performs a read and compare command, as described above. Storage nodes $170_2$-$170_N$ (all storage nodes except the first storage node $170_1$) replace previously stored data with data payload 230 if the previously stored data does not match data payload 230, prior to transmitting the compare status frame to computation node 160.

If storage command 228 specifies a read, compare, and delete command, then each storage node performs a read and compare command, as described above. Storage nodes $170_2$-$170_N$ (all storage nodes except the first storage node $170_1$) delete previously stored data if the previously stored data does not match data payload 230, prior to transmitting the compare status frame to computation node 160.

If storage command 228 specifies a read and copy command, then the first storage node $170_1$ retrieves data from the location specified by target LBA/keys $224_1$ and returns the retrieved data to computation node 160. Storage node $170_1$ then transmits command frame 200 to the second storage node $170_2$ where payload data 230 includes a copy of the retrieved data. Each of storage nodes $170_2$-$170_N$ stores the payload data 230 into the location specified by respective target LBA/keys $224_2$-$224_N$.

Finally, if storage command 228 specifies a mass delete command, then each storage node $170_1$-$170_N$ deletes the data at the location specified by respective target LBA/keys $224_1$-$224_N$.

During execution of any of the above commands, one of the storage nodes may encounter a failure, including, without limitation, a physical device failure, a full drive failure, or a data not found failure. If the status option in SSESP header 218 directs only the final target source node $170_N$ to transmit a status frame, then storage node $170_N$ transmits a successful completion status frame to computation node 160 if the command is successfully performed by each storage node $170_1$-$170_N$. If a particular storage node encounters a failure, then that storage node transmits a failure status frame to computation node 160. Alternatively, the storage node prior to the storage node that encountered a failure transmits the failure status frame to computation node 160. However, if the status option in SSESP header 218 directs all target source nodes $170_1$-$170_N$ to transmit a status frame, then a completion status is returned by each storage node $170_1$-$170_N$ whether the command resulted in successful completion or in a failure.

Data payload 230 includes the actual data processed by the destination node. For example, if storage command 228 indicates a copy on write command, then data payload 230 would include the data to be stored in the destination node. If storage command 228 indicates a read and compare command, then data payload 230 would include the data to be compared with corresponding data in the destination node.

Frame check sequence 232 is a calculated value, such as a cyclic redundancy check (CRC) value, which allows detection of corrupted data within command frame 200.

Figure 3:
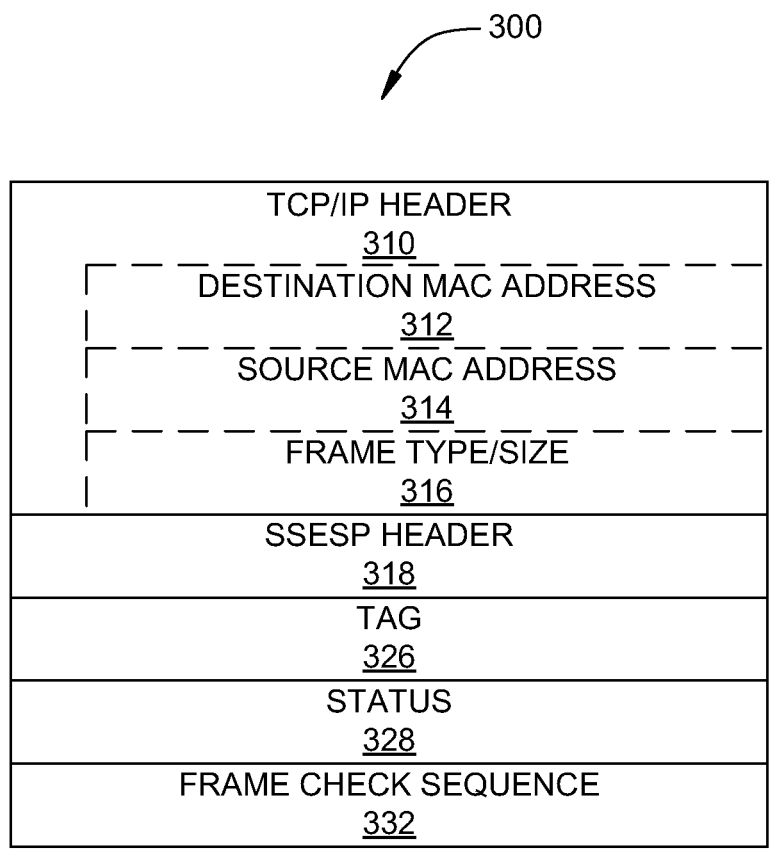
FIG. 3 illustrates a self-steering point-to-point status frame, according to one embodiment.

FIG. 3 illustrates a self-steering Ethernet storage protocol (SSESP) status frame 300, according to one embodiment. As shown, status frame 300 includes a TCP/IP header 310, which, in turn, includes a destination media access control (MAC) address 312, a source MAC address 314, and a frame type/size field 316. As also shown, status frame 300 includes an SSESP header 318, a tag 326, a status 328, and a frame check sequence 332. TCP/IP header 310, destination MAC address 312, source MAC address 314, frame type/size 316, SSESP header 318, tag 326, and frame check sequence 332 function substantially the same as their counterparts in FIG. 2, except as further described below.

SSESP header 318 contains various fields associated with status frame 300. These fields (not explicitly shown) include, without limitation, an Internet protocol (IP) format type and the quantity of target status frames. The field specifying IP format type indicates the version of IP associated with status frame 300, e.g. IPv4 or IPv6. The quantity of target status frames specifies how many status frames are transmitted to computation node 160 in response to command frame 200. If the status option of corresponding command frame 200 directs only the last storage node $170_N$ to transmit a status frame 300, then the quantity of target status frames is set to one. If, however, the status option of corresponding command frame 200 directs all storage nodes $170_1$-$170_N$ to transmit a status frame 300, then the quantity of target status frames is set to N.

Tag 326 enables traffic tracking and queuing for command frames, such as command frame 200. Tag 326 of status frame 300 is set to the value of tag 226 in corresponding command frame 200. Computation node 160 receives status frame 300 and compares tag 326 with tag 226 to identify command frame 200 that originated the SSESP command. In this manner, computation node 160 monitors the progress of command frame 200 as command frame 200 is processed by storage nodes $170_1$-$170_N$.

Status 328 is set to a first value if a particular storage node successfully processes and completes storage command 228 in command frame 200. Status 328 is set to a second value if a particular storage node encounters a failure while processing storage command 228 in command frame 200. The second value may also indicate a particular failure mode encountered by the storage node. In some embodiments, status 328 may be set to other values, according to the specific command specified by storage command 228. For example, if storage command 228 specifies a read and compare command (including a read, compare, and replace command or a read, compare, and delete command), then status 328 could be set to a third value if a particular storage node detects a mis-compare between a local copy of data and data payload 230.

It will be appreciated that the system shown herein is illustrative and that variations and modifications are possible. For example, although described in the context of Ethernet protocol, any distributed storage system that employs any technically feasible point-to-point communications protocol lies within the scope of this disclosure, whether or not the point-to-point communications protocol is compliant with the Ethernet protocol. In general, a point-to-point protocol is a data link protocol that establishes a direct connection between a pair of nodes. Such point-to-point protocols may be compatible with any technically feasible communications standard including, without limitation, Ethernet and asynchronous transfer mode (ATM).

Figure 4A:
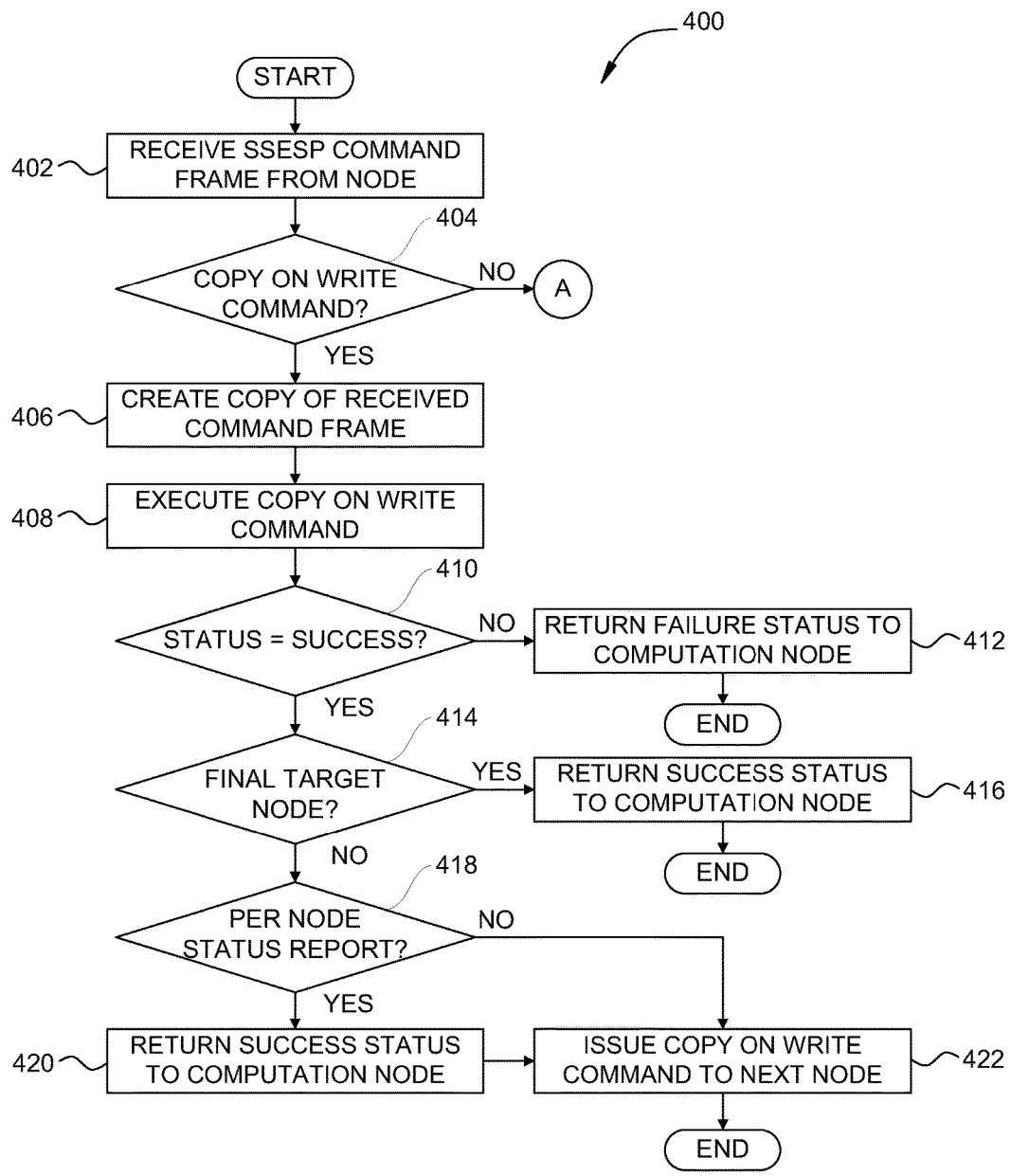
FIGS. 4A-4C set forth a flow diagram of method steps for processing a self-steering storage command via a point-to-point communication protocol, according to one embodiment.
Figure 4B:
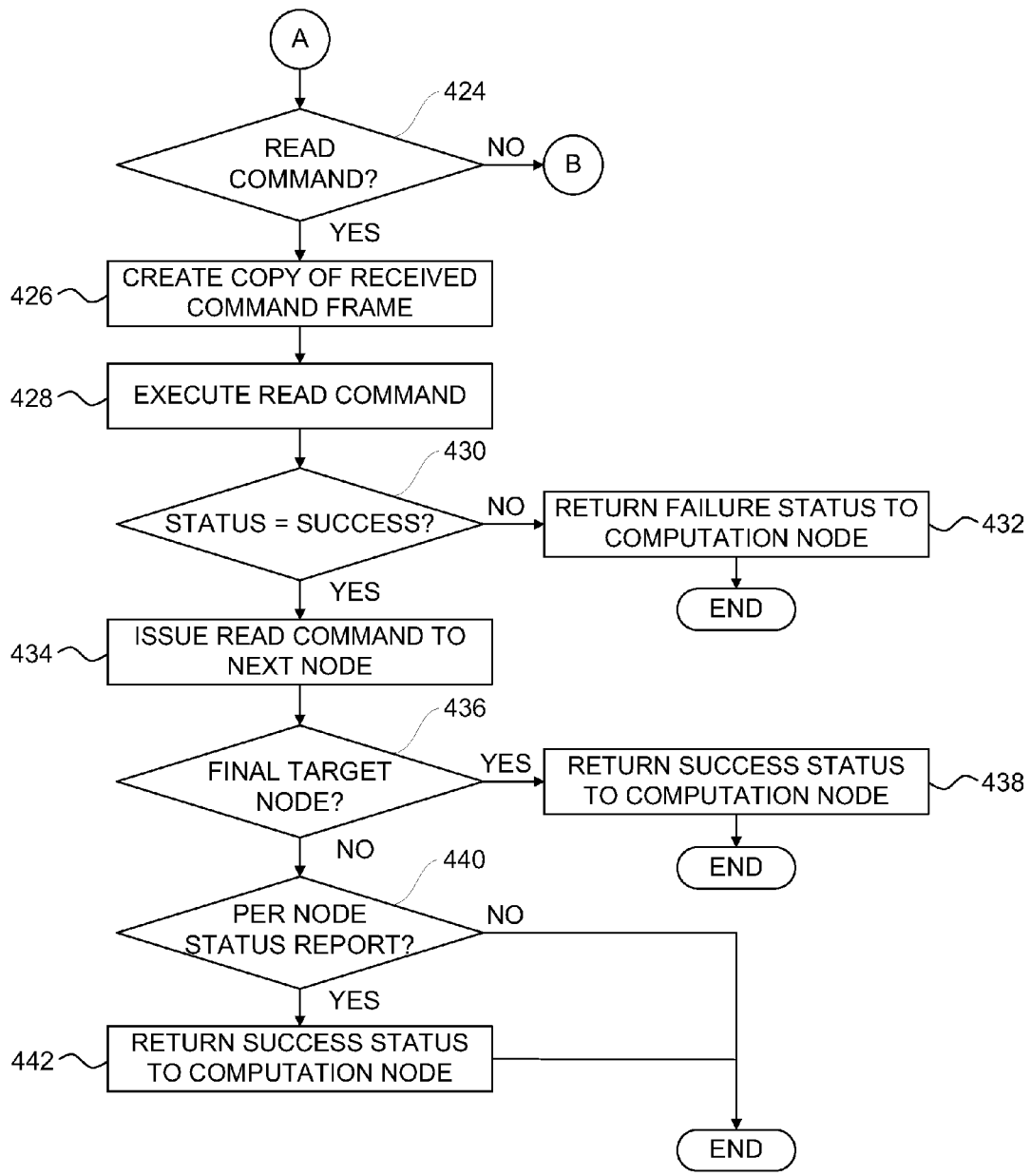
Figure 4C:
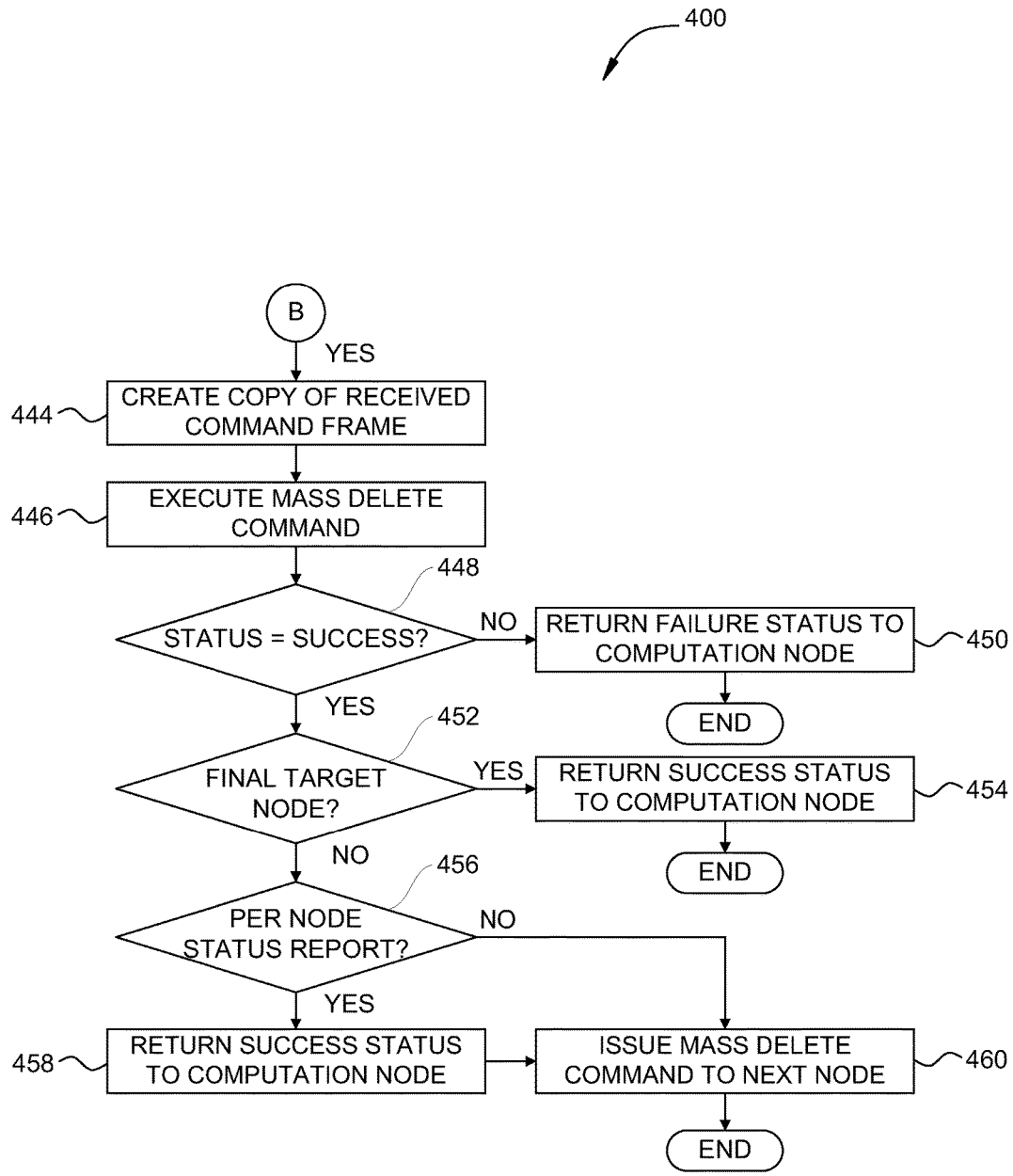

FIGS. 4A-4C set forth a flow diagram of method steps for processing a self-steering storage command via a point-to-point communication protocol, according to one embodiment. Although the method steps are described in conjunction with the systems of FIGS. 1A-3, persons of ordinary skill in the art will understand that any system configured to perform the method steps is within the scope of the present invention.

As shown, a method 400 begins at step 402, where a storage node in a set of storage nodes $170_1$-$170_N$ receives a self-steering Ethernet storage protocol (SSESP) command from either computation node 160 or from a previous storage node in the set of storage nodes $170_1$-$170_N$. At step 404, the storage node determines whether the SSESP command is a copy on write command. If the SSESP command is a copy on write command, then the method 400 proceeds to step 406, where the storage node creates a copy of the received command frame. At step 408, the storage node executes the copy on write command. At step 410, the storage node determines whether the copy on write command completed successfully. If the copy on write command did not complete successfully, then the method 400 proceeds to step 412, where the storage node transmits a status frame with a failure status to computation node 160. The method 400 then terminates.

If, at step 410, the copy on write command completed successfully, then the method 400 proceeds to step 414, where the storage node determines whether the storage node is the final storage node $170_N$ in the set of storage nodes $170_1$-$170_N$. If the storage node is the final storage node $170_N$, then the method 400 proceeds to step 416, where the storage node transmits a status frame with a successful completion status to computation node 160. The method 400 then terminates.

If, at step 414, the storage node is not the final storage node, then the method 400 proceeds to step 418, where the storage node determines whether the status option directs all storage nodes $170_1$-$170_N$ to transmit a status frame. If the status option directs all storage nodes $170_1$-$170_N$ to transmit a status frame, then the method proceeds to step 420, where the storage node transmits a status frame with a successful completion status to computation node 160. At step 422, the storage node issues a copy on write command frame to the next storage node as specified by command frame 200. The method 400 then terminates.

If, at step 418, the status option does not direct all storage nodes $170_1$-$170_N$ to transmit a status frame, then the method proceeds to step 422 described above.

Returning to step 404, if the SSESP command is not a copy on write command, then the method 400 proceeds to step 424, where the storage node determines whether the SSESP command is a read command. The SSESP command may be any type of read command, including, without limitation, a (1) read and compare command; (2) read, compare, and replace command; (3) read, compare, and delete command; or (4) read and copy command. If the SSESP command is a read command, then the method 400 proceeds to step 426, where the storage node creates a copy of the received command frame. At step 428, the storage node executes the read command. At step 430, the storage node determines whether the read command completed successfully. If the read command did not complete successfully, then the method 400 proceeds to step 432, where the storage node transmits a status frame with a failure status to computation node 160. The method 400 then terminates.

If, at step 430, the read command completed successfully, then the method 400 proceeds to step 434, where the storage node issues a read command frame to the next storage node as specified by command frame 200. At step 436, the storage node determines whether the storage node is the final storage node $170_N$ in the set of storage nodes $170_1$-$170_N$. If the storage node is the final storage node $170_N$, then the method 400 proceeds to step 438, where the storage node transmits a status frame with a successful completion status to computation node 160. The method 400 then terminates.

If, at step 436, the storage node is not the final storage node, then the method 400 proceeds to step 440, where the storage node determines whether the status option directs all storage nodes $170_1$-$170_N$ to transmit a status frame. If the status option directs all storage nodes $170_1$-$170_N$ to transmit a status frame, then the method proceeds to step 442, where the storage node transmits a status frame with a successful completion status to computation node 160. The method 400 then terminates.

If, at step 440, the status option does not direct all storage nodes $170_1$-$170_N$ to transmit a status frame, then the method 400 terminates.

Returning to step 424, if the SSESP command is not a read command, then the SSESP command is a mass delete command. The method 400 proceeds to step 444, where the storage node creates a copy of the received command frame. At step 446, the storage node executes the mass delete command. At step 448, the storage node determines whether the mass delete command completed successfully. If the mass delete command did not complete successfully, then the method 400 proceeds to step 450, where the storage node transmits a status frame with a failure status to computation node 160. The method 400 then terminates.

If, at step 448, the mass delete command completed successfully, then the method 400 proceeds to step 452, where the storage node determines whether the storage node is the final storage node $170_N$ in the set of storage nodes $170_1$-$170_N$. If the storage node is the final storage node $170_N$, then the method 400 proceeds to step 454, where the storage node transmits a status frame with a successful completion status to computation node 160. The method 400 then terminates.

If, at step 452, the storage node is not the final storage node, then the method 400 proceeds to step 456, where the storage node determines whether the status option directs all storage nodes $170_1$-$170_N$ to transmit a status frame. If the status option directs all storage nodes $170_1$-$170_N$ to transmit a status frame, then the method proceeds to step 458, where the storage node transmits a status frame with a successful completion status to computation node 160. At step 460, the storage node issues a mass delete command frame to the next storage node as specified by command frame 200. The method 400 then terminates.

If, at step 456, the status option does not direct all storage nodes $170_1$-$170_N$ to transmit a status frame, then the method proceeds to step 460 described above.

In sum, embodiments described herein provide techniques for processing self-steering command frames directed to storage nodes in a distributed storage network. A computation node transmits a command frame to a first storage node in a group of storage nodes via a point-to-point communication protocol, such as Ethernet protocol. The first storage node processes the command frame by storing or modifying data as directed by the command frame. If additional nodes are specified by the command frame, the first storage nodes creates a copy of the command frame and transmits the copy of the command frame to the next storage node, as specified in the command frame.

In turn, each storage node specified by the command frame receives the command frame, processes the command frame by storing or modifying the data as directed, and transmitting a copy of the command frame to the next storage node. The last storage node receives and processes the command frame and then returns a status frame to the originating computation node, indicating that the command frame has been processed by the storage nodes. Alternatively, each storage node transmits a status frame to the originating computation node upon processing the command frame. Advantageously, the processing burden on the computation node decreases, because that the computation node transmits only one command frame to store or modify a data file, rather than transmitting a command frame to each storage node that contains a replica of the data file. As a result, the computation node expends less computational power to manage traffic among the storage nodes, leaving more computational power for other tasks, such as executing software applications.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to embodiments of the present invention, other and further embodiments of the invention may be devised without departing from the basic scope thereof, and the scope thereof is determined by the claims that follow.

What is claimed is:

1. A method for processing a self-steering storage command via a point-to-point communication protocol, the method implemented in a current storage node that is one of a plurality of storage nodes, comprising:

receiving, at the current storage node, a current instance of a current command frame directed to the plurality of storage nodes;

performing a storage operation in response to a storage command associated with the current command frame;

determining whether all storage nodes in the plurality of storage nodes have received an instance of the current command frame, based on address information in the current command frame;

when it is determined that all storage nodes in the plurality of storage nodes have received an instance of the current command frame based on the address information in the current command frame, transmitting a final completion status frame directly to a computation node that originated the current command frame; and when it is determined that all storage nodes in the plurality of storage nodes have not received an instance of the current command frame based on the address information in the current command frame, generating a next instance of the current command frame, and transmitting the next instance of the current command frame directly to another storage node in the plurality of storage nodes.

2. The method of claim 1, wherein the storage command comprises a copy on write command, and the storage operation comprises storing data of a data payload portion of the current instance of the current command frame at a location within the current storage node.

3. The method of claim 1, wherein the storage command comprises a read and compare command, and the storage operation comprises:

retrieving data from a location within the current storage node;

determining whether no other storage node in the plurality of storage nodes has received an instance of the current command frame;

when it is determined that no other storage node in the plurality of storage nodes has received an instance of the current command frame, transmitting the data directly to the computation node; and when it is determined that at least one other storage node in the plurality of storage nodes has received an instance of the current command frame, comparing the retrieved data with a data payload portion of the current instance of the current command frame, and upon determining that the retrieved data differs from the data payload portion, transmitting a mis-compare status frame directly to the computation node.

4. The method of claim 1, wherein the storage command comprises a read, compare, and replace command, and the storage operation comprises:

retrieving data from a location within the current storage node;

determining whether no other storage node in the plurality of storage nodes has received an instance of the current command frame;

when it is determined that no other storage node in the plurality of storage nodes has received an instance of the current command frame, transmitting the data directly to the computation node, and when it is determined that at least one other storage node in the plurality of storage nodes has received an instance of the current command frame, comparing the retrieved data with a data payload portion of the current instance of the current command frame, and upon determining that the retrieved data differs from the data payload portion, transmitting a mis-compare status frame directly to the computation node, and storing the data of the data payload portion at the location within the current storage node.

5. The method of claim 1, wherein the storage command comprises a read, compare, and delete command, and the storage operation comprises:

retrieving data from a location within the current storage node;

determining whether no other storage node in the plurality of storage nodes has received an instance of the current command frame;

when it is determined that no other storage node in the plurality of storage nodes has received an instance of the current command frame, transmitting the data directly to the computation node; and when it is determined that at least one other storage node in the plurality of storage nodes has received an instance of the current command frame, comparing the retrieved data with a data payload portion of the current instance of the current command frame, and upon determining that the retrieved data differs from the data payload portion, transmitting a mis-compare status frame directly to the computation node, and deleting the data at the location within the current storage node.

6. The method of claim 1, wherein the storage command comprises a read and copy command, and the storage operation comprises:

retrieving data from a location within the current storage node;

determining whether no other storage node in the plurality of storage nodes has received an instance of the current command frame;

when it is determined that no other storage node in the plurality of storage nodes has received an instance of the current command frame, transmitting the data directly to the computation node; and when it is determined that at least one other storage node in the plurality of storage nodes has received an instance of the current command frame, storing the data of the data payload portion at the location within the current storage node.

7. The method of claim 1, wherein the storage command comprises a mass delete command, and the storage operation comprises deleting data at a location within the current storage node.

8. The method of claim 1, further comprising:

when it is determined that all storage nodes in the plurality of storage nodes have not received an instance of the current command frame, determining that the current command frame directs all storage nodes in the plurality of storage nodes to report status upon performing the storage operation, and transmitting a node completion status frame directly to the computation node.

9. The method of claim 8, wherein the current instance of the current command frame comprises a first tag value, the next instance of the current command frame comprises a second tag value, the node completion status frame comprises a third tag value, and wherein the first tag value, the second tag value, and the third tag value are equal.

10. The method of claim 9, further comprising, upon transmitting the node completion status frame to the computation node, then receiving, at the current storage node, an instance of a next command frame directed to the plurality of storage nodes.

11. The method of claim 9, wherein the instance of a next command frame comprises a fourth tag value that is different from the first tag value.

12. The method of claim 1, wherein the point-to-point communication protocol comprises Ethernet protocol.

13. A non-transitory computer-readable storage medium including instructions that, when executed by a processor of a current storage node that is one of a plurality of storage nodes, cause the processor to process a self-steering storage command via a point-to-point communication protocol, by performing the steps of:

receiving, at the current storage node, a current instance of a current command frame directed to the plurality of storage nodes;

performing a storage operation in response to a storage command associated with the current command frame;

determining whether all storage nodes in the plurality of storage nodes have received an instance of the current command frame, based on address information in the current command frame;

when it is determined that all storage nodes in the plurality of storage nodes have received an instance of the current command frame based on the address information in the current command frame, transmitting a final completion status frame directly to a computation node that originated the current command frame; and when it is determined that all storage nodes in the plurality of storage nodes have not received an instance of the current command frame based on the address information in the current command frame, generating a next instance of the current command frame, and transmitting the next instance of the current command frame directly to another storage node in the plurality of storage nodes.

14. The non-transitory computer-readable storage medium of claim 13, wherein the storage command comprises a copy on write command, and the storage operation comprises storing data of a data payload portion of the current instance of the current command frame at a location within the current storage node.

15. The non-transitory computer-readable storage medium of claim 13, wherein the storage command comprises a read and compare command, and the storage operation comprises:

retrieving data from a location within the current storage node;

determining whether no other storage node in the plurality of storage nodes has received an instance of the current command frame;

when it is determined that no other storage node in the plurality of storage nodes has received an instance of the current command frame, transmitting the data directly to the computation node; and when it is determined that at least one other storage node in the plurality of storage nodes has received an instance of the current command frame, comparing the retrieved data with a data payload portion of the current instance of the current command frame, and upon determining that the retrieved data differs from the data payload portion, then transmitting a mis-compare status frame directly to the computation node.

16. The non-transitory computer-readable storage medium of claim 13, wherein the storage command comprises a read, compare, and replace command, and the storage operation comprises:
retrieving data from a location within the current storage node;
determining whether no other storage node in the plurality of storage nodes has received an instance of the current command frame;
when it is determined that no other storage node in the plurality of storage nodes has received an instance of the current command frame, then transmitting the data directly to the computation node; and
when it is determined that at least one other storage node in the plurality of storage nodes has received an instance of the current command frame,
comparing the retrieved data with a data payload portion of the current instance of the current command frame, and
upon determining that the retrieved data differs from the data payload portion, transmitting a mis-compare status frame directly to the computation node, and storing the data of the data payload portion at the location within the current storage node.

17. The non-transitory computer-readable storage medium of claim 13, wherein the storage command comprises a read, compare, and delete command, and the storage operation comprises:
retrieving data from a location within the current storage node;
determining whether no other storage node in the plurality of storage nodes has received an instance of the current command frame;
when it is determined that no other storage node in the plurality of storage nodes has received an instance of the current command frame, transmitting the data directly to the computation node; and
when it is determined that at least one other storage node in the plurality of storage nodes has received an instance of the current command frame,
comparing the retrieved data with a data payload portion of the current instance of the current command frame, and
upon determining that the retrieved data differs from the data payload portion, transmitting a mis-compare status frame directly to the computation node, and deleting the data at the location within the current storage node.

18. The non-transitory computer-readable storage medium of claim 13, wherein the storage command comprises a read and copy command, and the storage operation comprises:
retrieving data from a location within the current storage node;
determining whether no other storage node in the plurality of storage nodes has received an instance of the current command frame;
when it is determined that no other storage node in the plurality of storage nodes has received an instance of the current command frame, transmitting the data directly to the computation node; and
when it is determined that at least one other storage node in the plurality of storage nodes has received an instance of the current command frame, storing the data of the data payload portion at the location within the current storage node.

19. The non-transitory computer-readable storage medium of claim 13, wherein the storage command comprises a mass delete command, and the storage operation comprises deleting data at a location within the current storage node.

20. A storage node comprising:
a memory; and
a processor that is configured to execute instructions for a program that are stored in the memory to process a self-steering storage command via a point-to-point communication protocol, by:
receiving, at the current storage node in a plurality of storage nodes, a current instance of a current command frame directed to the plurality of storage nodes;
performing a storage operation in response to a storage command associated with the current command frame;
determining whether all storage nodes in the plurality of storage nodes have received an instance of the current command frame, based on address information in the current command frame;
when it is determined that all storage nodes in the plurality of storage nodes have received an instance of the current command frame based on the address information in the current command frame, transmitting a final completion status frame directly to a computation node that originated the current command frame; and
when it is determined that all storage nodes in the plurality of storage nodes have not received an instance of the current command frame based on the address information in the current command frame, generating a next instance of the current command frame, and transmitting the next instance of the current command frame directly to another storage node in the plurality of storage nodes.

* * * * *